United States Patent [19]

Komine et al.

[11] 4,196,984
[45] Apr. 8, 1980

[54] CINECAMERA EQUIPMENT CAPABLE OF SYNCHRONOUS SOUND RECORDING

[75] Inventors: Yoshio Komine; Hiroshi Furukawa, both of Tokyo; Kiyoshi Takahashi, Kunitachi; Tomoshi Takigawa, Machida; Mitsutoshi Ogiso, Kawasaki; Toshikazu Ichiyanagi, Tokyo, all of Japan

[73] Assignee: Canon Kabushiki Kaisha, Tokyo, Japan

[21] Appl. No.: 852,226

[22] Filed: Nov. 17, 1977

Related U.S. Application Data

[60] Division of Ser. No. 459,220, Apr. 8, 1974, Pat. No. 4,076,396, which is a continuation of Ser. No. 304,496, Nov. 7, 1972, abandoned.

[30] Foreign Application Priority Data

Nov. 8, 1971 [JP] Japan .................................. 46-88891
Nov. 11, 1971 [JP] Japan ................................ 46-108660
Nov. 13, 1971 [JP] Japan ................................. 46-90985

[51] Int. Cl.² .......................................... G03B 31/02
[52] U.S. Cl. ........................................ 352/27; 352/72
[58] Field of Search ................. 352/72, 27, 78 R, 157, 352/158, 159

[56] References Cited

U.S. PATENT DOCUMENTS

| | | | |
|---|---|---|---|
| 2,912,899 | 11/1959 | Wangerin et al. | 352/72 |
| 3,025,750 | 3/1962 | Polan et al. | 352/72 |
| 3,134,294 | 5/1964 | Kaden et al. | 352/159 |
| 3,208,654 | 9/1965 | Gasser | 352/157 |
| 3,442,580 | 5/1969 | Winkler | 352/72 |
| 3,454,333 | 7/1969 | Wells | 352/72 |
| 3,464,765 | 9/1969 | Broeckl et al. | 352/72 |
| 3,532,292 | 10/1970 | Crandall et al. | 352/72 |
| 3,561,851 | 2/1971 | Martin | 352/78 R |

Primary Examiner—Monroe H. Hayes
Attorney, Agent, or Firm—Toren, McGeady and Stanger

[57] ABSTRACT

A motion picture camera is adapted to receive a film magazine containing a roll of sound recordable photographic film. A housing forms a chamber to receive the magazine. A cover opens and closes the chamber. A recording system records sound signals on the film. A setting arrangement engages the recorder system and the film with each other so as to record signals. The setting arrangement is movable into a first position where the film engages the recorder and a second position where the film is disengaged from the recorder so as to be incapable of recording sound signals. A transport device is coupled to the setting arrangement in the first position when the recorder is in the first position. An interconnecting system responds to closure of the cover for moving the setting arrangement from the second position to the first position so that the camera can be set for sound signal recording in response to the closing of the cover.

4 Claims, 16 Drawing Figures

PRIOR ART

CINECAMERA EQUIPMENT CAPABLE OF SYNCHRONOUS SOUND RECORDING

This is a division of Application Ser. No. 459,220, filed Apr. 8, 1974, now U.S. Pat. No. 4,076,396, which in turn is a Continuation application of Ser. No. 304,496, filed Nov. 7, 1972, now abandoned.

BACKGROUND OF THE INVENTION

1. Field of the Invention

The invention relates to a motion picture camera having a film driving mechanism and a synchronous sound recording system, and especially to a motion picture camera having a mechanism that drives film at a constant speed and draws the film out of the magazine for sound recording.

2. Description of the Prior Art

Until recently it was impossible to record sound on film in a magazine or the like. In order to take a sound motion picture with the film in a magazine, specially prepared sound recording equipment such as tape recorder was used and driven synchronously with the feed of film.

However, such method is so complicated that the film is often mishandled or so much time is lost, that many picture taking opportunities are missed. U.S. Pat. No. 3,561,851 discloses a sound film magazine, out of which the film is led for sound recording.

When a so-called sound film capable of synchronous sound recording is loaded in a motion picture camera and light and sound are recorded, it is necessary to pay more attention to handling than with a conventional motion picture camera. For example, it is considered to be essential to provide a safety device, lest the cover of film chamber should be opened carelessly and the film led out of the magazine be exposed to the light. Thus what is desired is a new kind of motion picture which even an unskilled photographer can easily handle.

SUMMARY OF THE INVENTION

The purpose of the present invention is to provide a motion picture camera with which sounds can be recorded at the same time as pictures.

The present invention involves providing a motion picture camera which possesses means to form a film channel outside of the film magazine to lead the film out of the magazine and back, means to drive the film led out of the film magazine, means to detect the film exiting the film magazine and locking means receiving an electrical or a mechanical signal from said detecting means and prohibiting the opening of the cover of magazine chamber before finishing of the film.

Another purpose of the present invention is to provide a motion picture camera which possesses means to form a film channel outside of the film magazine to lead the film out of the magazine, to drive the film and to lead the film into the magazine, means to drive the film along a channel outside of the magazine and means to bring at least one of the above two means on the discharging position by means of the opening operation of the cover of the magazine chamber.

Another purpose of the present invention is to provide a magazine motion picture camera in which the film can be changed from the channel inside the magazine into that outside of the magazine and again into that inside the magazine, and which possesses as a demountable accessory on its body to feed the film inside of the magazine intermittently, means to drive the film existing outside of the magazine, means to record sound signals on the film running in the channel outside of the magazine, means to switch the film channel inside of the magazine over to that outside of the magazine.

Further purposes and features of the present invention will be disclosed from the following detailed when read in light of the following drawings.

DESCRIPTION OF THE PREFERRED EMBODIMENT

The magazine disclosed in the U.S. Pat. No. 3,561,851 and containing a film capable of synchronous sound recording is shown in FIGS. 1 to 4.

Figure 1:
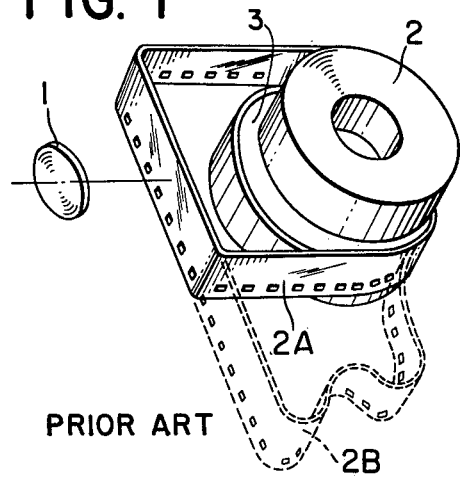
FIG. 1 shows in perspective a film roll contained in a conventional magazine, having changeable film channels.
Figure 2:
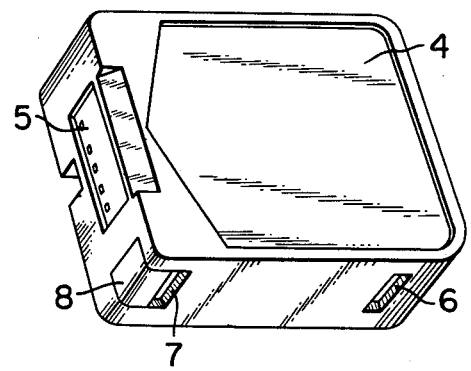
FIG. 2 is a perspective drawing showing the magazine containing said film.
Figure 3:
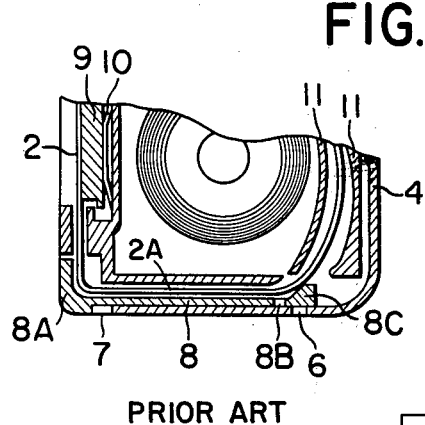
FIG. 3 shows a partial section of the film channel inside of the magazine.
Figure 4:
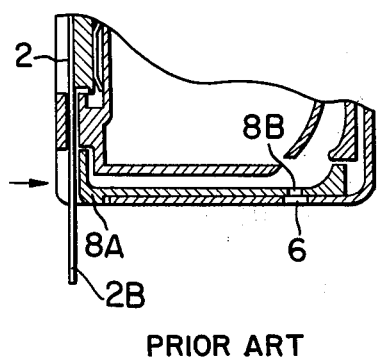
FIG. 4 is a partial section showing the film channel switched over to lead the film out of the magazine of FIG. 3.
Figure 8:
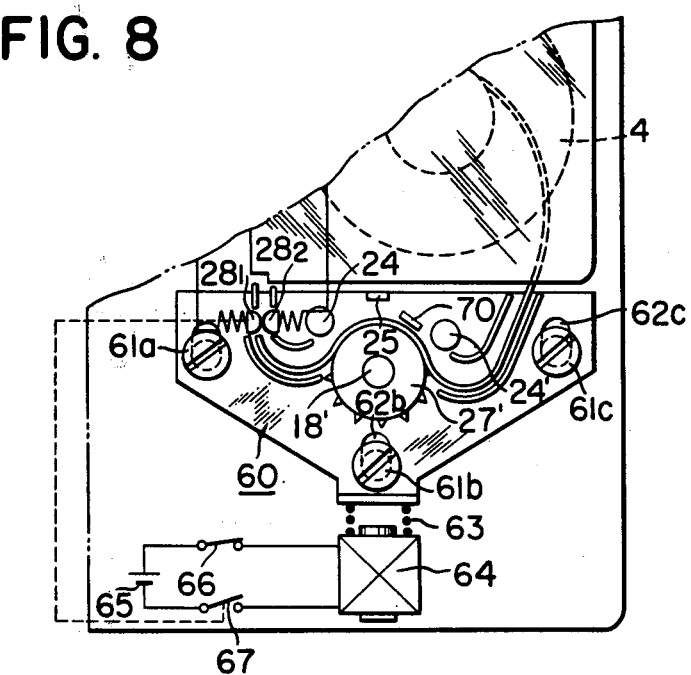
FIG. 8 shows a front view of a motion picture camera of FIG. 7, whose cover is opened after finishing recording of pictures and sounds.

FIG. 1 shows the running route of a film in roll contained in a film container such as magazine, wherein 1 is a camera lens, 2 a film roll at feeding side and 3 a reel at winding side. The portion designated 2A is a part of the film running along the film channel provided in advance in the magazine (hereinafter called film channel inside of magazine). The portion designated 2B is a part of the film running along the channel in which the film is led out of the magazine and fed (hereinafter called film channel outside of the magazine). In FIG. 2, a member 8 under the film gate 5 controls switching of the film channel inside the magazine to that outside of the magazine or vice versa. The section of the lower part of the magazine 4 containing the switching member 8 of FIG. 2 is shown in more detail in FIG. 3. Here the switching member 8 is situated in a position such that the film channel inside of the magazine is formed, and so that the switching member 8 is slidable toward the right. The structure designated 8A is the head of the switching member, which protrudes on the lower surface of the front part of the magazine in such a manner that the head engages with other means to move the switching member towards the right. The structure designated 8B is an opening for the film channel running through the switching member 8, so that when the switching member 8 slides toward the right, the axis of the opening 8B alignes with that of the opening 6 provided on the lower surface of the magazine. The openings 8B and 6 then form a channel through which the film leaving of the magazine can again be enter. The structure designated 8C is the tail of the magazine serving as a film guide which controls the running direction of the film. When the switching member is not moved towards the right as shown in FIG. 3, and the film channel inside of the magazine is formed, the openings 6 and 7 on the lower surface of the magazine are covered by the switching member 8. The latter situated as shown in FIG. 8 so that the light from outside is cut off. When the head 8A is pressed along the direction of arrow in FIG. 4 and the switching member 8 is moved toward the right, the opening 8B of the switching member 8 and the opening 6 on the lower surface of the magazine align with each other to form an inlet opening to allow the film leaving the magazine to reenter the magazine. In this way the film led out of the magazine as shown in FIG. 4 can form a film channel as shown at 2B in FIG. 4.

In FIG. 3 member 9 is a film press plate of film, while 10 is a film press spring and 11 a film guide provided on the magazine.

With such a magazine, the film exposed to the light coming through the aperture and the film gate 5 of the magazine is drawn straight down out of the magazine chamber by operating the switching member 8. The film passes through the film channel outside of the magazine.

The film gate can be engaged with a mechanism to feed the film forwards or backwards. Further on the film channel outside of the magazine a driving mechanism with stabilised feeding speed can be provided synchronously encode the sound recording band on the film with a sound signal, a, or both, for the sound reproducing mechanism of cine-projector.

Figure 5:
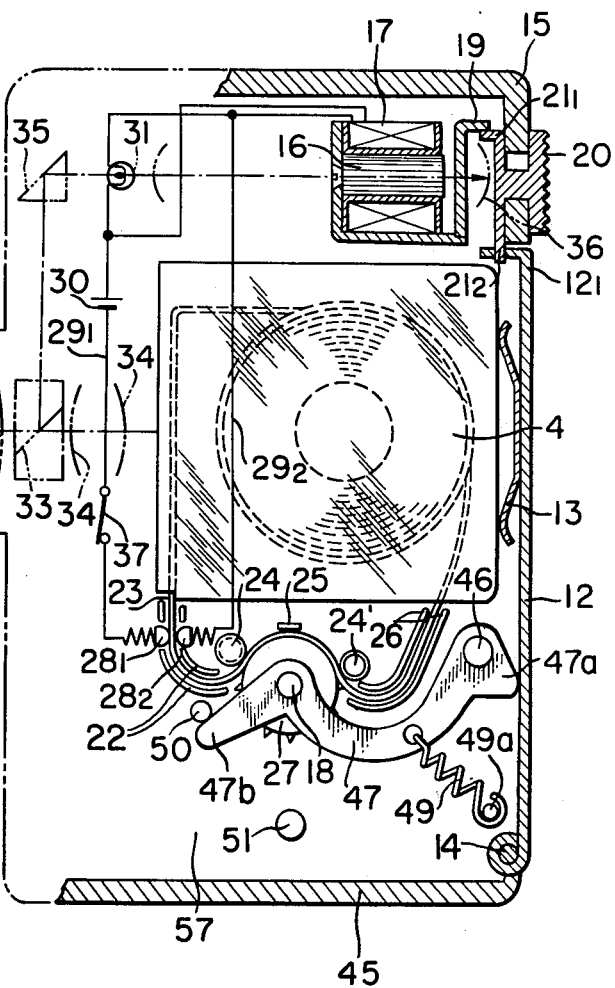
FIG. 5 shows a partial section to show the internal disposition of the motion picture camera according to the present invention capable of synchronous sound recording in which the conventional magazine of FIG. 1 to FIG. 4 can be used, and in which the sounds are recorded synchronously with picture.
Figure 6:
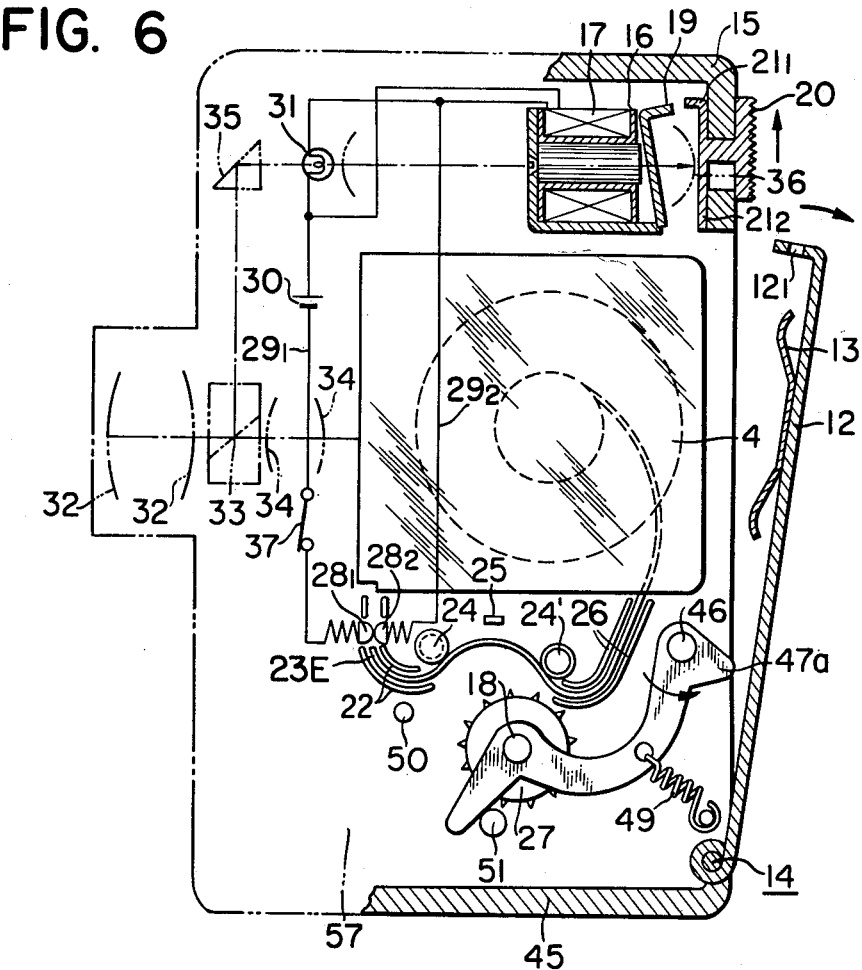
FIG. 6 is a section of the motion picture camera of FIG. 5 whose cover is opened after finishing recording of pictures and sounds.

FIGS. 5 and 6 show important components of the motion picture camera according to the invention. In FIG. 5 the film is being advanced, while in FIG. 6 the film is no longer advanced and the cover is opened, drawn straight down out of the magazine chamber 4 is the magazine mentioned above from which the film can be led out. The magazine 4, is pressed by a spring 13 or the like provided on a cover 12 of the magazine chamber to the right in the drawing, so as to keep it at a certain position inside the camera. The cover 12 can be opened by pivoting it clockwise, as seen in FIG. 5, about a member 14. The camera cover 15 is mounted to cover the opening of the magazine chamber in order to prevent light from entering into the film chamber. Film guides 22 and 26 control the film channel outside of the magazine, while 24 and 24' are a pair of guide rollers provided rotatably on the camera body. These guides and rollers form the channel for the film 23 led out of the magazine. An axis is 18 mounted on the camera body supports the sprocket 27 rotatably. The axis 18 of the sprocket is at the position shown in FIG. 5 connected with a film driving source not shown. The sprocket is driven at a constant speed along the clockwise direction to feed the film at a constant speed. An optical or a magnetic head 25 records a sound signal on the film and can be any photoelectrical or electromagnetic transducing means, such as a light emitting diode, responsive to the output of a microphone demountably provided on the camera. The driving action of the above mentioned sprocket can be replaced with that of a capstan and pinch roll.

Contact switches $28_1$ and $28_2$ on the film channel outside of the magazine detect the presence of film. These switches can be in the form of any means to detect the termination of film, for example, by detecting whether a counterclockwise frictional force from the film is applied to the guide roller 24 or 24' or by providing the switches on both sides of the film channel in such a manner that at the termination of film both switches close a circuit. It is desirable that this film detecting means should be provided at the back end of the film guide 26 or near the film inlet opening of the magazine in FIG. 5 and FIG. 6 in order to prevent as much film as possible outside of the magazine from being exposed to the light when the cover is opened. It is also desirable that the switches or the like should not come in contact with the photographing band on the film or the sound recording band or the like. In case the switches or the like are provided on the perforated part, it is further necessary that they be sufficiently large to avoid the vibration due to the perforations. A device disengaging the locking means for the cover 12 is explained later and is composed of these means.

Forming a locking means or a lock for the cover 12 are an electromagnetic plunger 16, its coil 17 and an iron piece or armature 19 biased clockwise by a spring not shown in the drawing is arranged to be attracted by the electromagnetic plunger 16. The lock also includes a slidable knob 20 with a stopping part $21_1$ engageable with the iron piece 19. The other end $21_2$ opposite to the one end $21_1$ of this knob 20 engaged the slot $12_1$ in the cover 12 by adaptor. Of course the above is one of the examples and a purely mechanical locking device or other conventional locking device may also be used. Two conductors $29_1$ and $29_2$ respectively connect the contact switch $28_1$ and switch $28_2$ with the coil end of the electromagnetic plunger, for which element 30 is an electric source for direct current. A switch 37 for the electrical source can be used as a main switch of the camera. The contact switches $28_1$ and $28_2$ connect a lamp 31 to the direct current electrical source 30. When the contact switches complete a circuit at the termination of film the lamp is lighted and this is indicated at the finder 36 of the camera to give warning to the operator of the camera. Members 32 and 34 are the photographing lens means of the motion picture camera. A half-mirror 33 inserted between the lenses 32 and 34 divides the light coming from the photographic object into two. One beam advances straight through the aperture not shown in the drawing of the camera and reaches the film. The other light beam changes its path at 90° and at the prism 35 again its path at 90° to reach the finder 36.

The film guides 22 and 26 are curved to form a loop of film the film inside of the magazine is fed intermittently at the film gate not shown in the drawing by means of claws or other conventional means while in the channel outside of the magazine the film must be fed at a constant speed in order to allow a synchronous sound recording. Thus the difference in film feeds due to the different driving must be absorbed. Member 47 is a lever bearing the sprocket axis 18 and is pressed along the anticlockwise direction by means of a spring 49 which is hung with the one end on a fixed axis 49a. The one end 47a of the lever 47 forms a protrusion and engages the cover 12 in such a manner that when the cover is closed a restrictive force is applied to the lever 47 from the cover along the clockwise direction in the drawing, so that the lever 47 is kept in a position shown in FIG. 1 against the force of the spring 49. Stoppers 50 and 51 engage the other end 47b of the lever so as to restrict the rotary zone of the lever 47. During cranking sprocket axis 18 is connected with a driving mechanism built-in the camera body but not shown and structured so the mechanical connection is disengaged by the anticlockwise rotation of the leverl 47. Any conventional disengaging mechanism can be applied, for example, to discharge the gear engagement. Member 45 is the lower wall of the camera.

The operation of the locking device is explained below with respect to FIGS. 5 and 6. In FIG. 6 the cover 12 has been turned around the axis 14 along the clockwise direction along the arrow so that, on termination of cranking, the magazine can be removed. The film end 23E engages the film guides 22 in the left of the drawing. Because film has been removed from between the contact switches 28$_1$ and 28$_2$ the latter closes a circuit which lights the warning lamp 31 in the finder and excites the electrical plunger 16. The iron piece 19 engaging the stop 21$_1$ as shown in FIG. 5 is now attracted and the engagement is released as shown in FIG. 6. In this state the knob 20 is slidable upwards as shown by the arrow in FIG. 6. When the knob 20 is moved up by hand the adapting part 21$_2$ of the knob 20 disengages from the slot 12$_1$ in the cover 12. The strength of the press spring 13 for the magnazine now opens the cover 12 as shown in FIG. 6 and the magnazine can be taken out.

In order to load a new magazine containing an unexposed film, a magazine is first inserted. After insertion the magazine the cover 12 is closed, the knob 20 is pushed down and member 21$_2$ enter the slot 12$_1$ of the cover 12 to lock the cover. Unless the main switch 37 is then opened, the armature 19 remains attracted by the electromagnet. After the light from outside is thus cut off, film is fed and in a short time the end of the film leader appears outside of the magazine and the contact switches 28$_1$ and 28$_2$ are opened. The warning lamp 31 is then put out and current running through the electrical magnet 16 is cut. The armature 19 is turned along the clockwise by the spring not shown in the drawing to engage with the member 21$_1$ of the knob. The knob 20 is then locked in a position where the knob 20 engages with the cover 12. Thus pictures and sounds can be simultaneously recorded on a film and the circuit for the sound recording can be cut as needed. When the film is being fed, and the contact switches are kept open, the cover 12 cannot be opened because the knob 20 is locked.

The operation to discharge the film into the channel is as follows. When the cover 12 of the magazine chamber 57 in the camera is closed and the the release button pushed, cranking starts. The film is made to run along the channel outside of the magazine to carry out the synchronous recording of sound signals, as shown in FIG. 5, because the lever end 47a is pushed to the position shown by the cover 12.

When the unexposed film in the magazine is finished (i.e., exposed), the film end passes through the contact switches 28$_1$ and 28$_2$ in the film channel outside of the magazine in such a manner that the contact switches 28$_1$ and 28$_2$ close. As mentioned the electromagnet attracts the armature 19 in such a manner that the operation of the knob 20 becomes possible. When the cover 12 is opened as shown in FIG. 6 by operating the knob 20, the force acting on the end 47a of the lever 47 disappears. This occurs so that the lever 47 is removed. The spring 49 now turns the lever 47 counterclockwise about the axis 46 until the other end 47b strikes at the stopper 51 as shown in FIG. 6. Thus the sprocket 27 on the lever 47 is also disengaged from the position to feed the film. The magazine can now be taken out and replaced with a new one. When the new magazine is loaded and the cover 12 is closed, the end 47a of the lever 47 is pushed by the cover 12 and assumes the condition shown in FIG. 5.

The above explanation gives an example of a mechanical film discharge method. It is also possible that the motion of the cover electromagnetically disengages the lever 47 with a plunger or the like.

Figure 7:
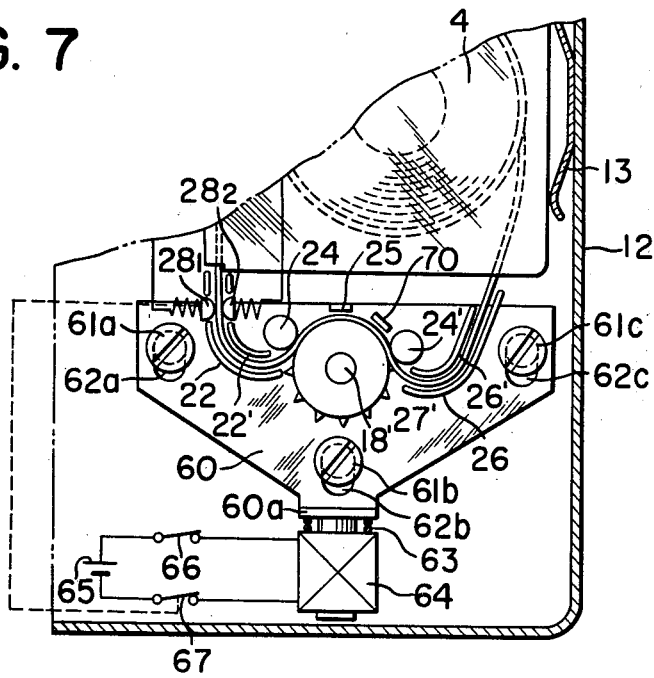
FIG. 7 is a partial section of a variation of the motion picture camera of FIG. 5 and FIG. 6.

FIGS. 7 and 8 show parts of another motion picture camera embodying the invention and using another channel disengaging device. FIG. 7 shows the relationships during cranking while FIG. 8 the relationships after cranking when the film channel is disengaged. In this embodiment the parts in common with those of the former embodiment bear the same figures, while the parts corresponding to other embodiments are primed. A sprocket axis 18' is rotatably mounted on the camera body and intended to make the sprocket 27' rotate by means of a driving mechanism not shown in the drawing. Member 60 is a support plate bearing internal film guides 22' and 26' for the film running through the channel outside of the chamber and the guide rollers 24, 24'. The plate 60 also carries an optical or a magnetic head 25 and is slidable upwards and downwards as shown. Pins 61a, 61b, and 61c are secured on the camera body, and slide in the slots 62a, 62b and 62c provided in the support plate 60 to control the sliding direction and quantity of the support plate 60. When an electromagnet 64 is supplied with current, it attracts the bottom 60a of the sprocket plate 60 and makes the plate 60 slide downwards against the spring 63. An electrical source 65 energizes the electromagnet 64 and other driving mechanisms of the system through a main switch 66. A conventional switch 67 is connected with the camera body and the cover so as to turn on when the cover of the camera is closed and to turn off when the cover is opened. The switch 67 can be placed in functional connection with the contact switches 28$_1$ and 28$_2$ mentioned according to FIGS. 5 and 6 so as to open when contact switches 28$_1$ and 28$_2$ closed. The slide plate 60 can be displaced by means of the contact switches 28$_1$ and 28$_2$ only after the the film is withdrawn from between them.

The operation will be explained according to FIG. 7 and FIG. 8. When the film is wound the contact switches $28_1$ and $28_2$ close a circuit and the locking means is disengaged, the switch 67 is turned off by opening the cover of the film chamber and the supply of the plunger magnet 64 with current is interrupted. The support plate 60 slides upwards due to the strength of the spring 63 in the drawing to the position in FIG. 8. In that state the sprocket 27' is parted from the guide rollers 24 and 24' and the space between the film guide 22, 22' and those 26, 26' is also enlarged, so that the magazine 4 can be taken out along a direction perpendicular to the plane of FIG. 8. When a new magazine is loaded and the cover is closed, the switch 67 closer circuit and the working iron piece of the plunger magnet 64 attracts the support plate 60 so that the support plate slides downwards to form a predetermined film channel.

Figure 9:
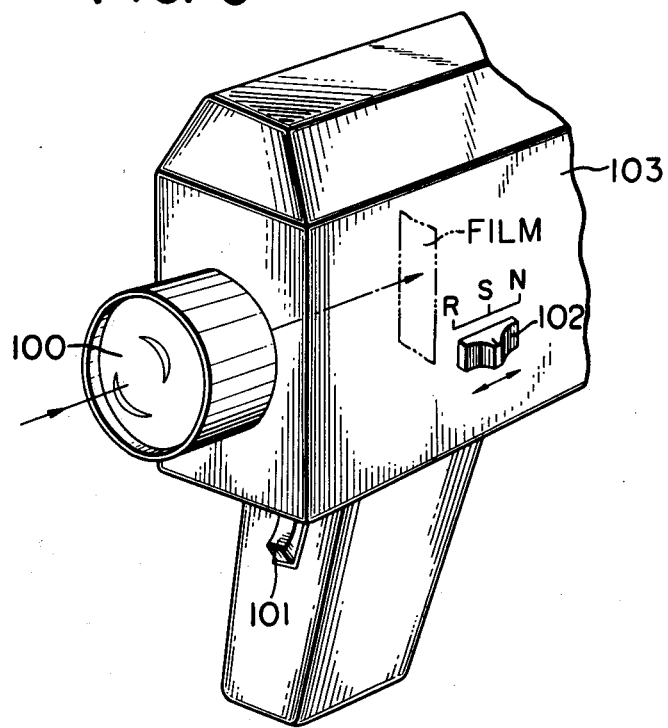
FIG. 9 shows in perspective a variation of the motion picture camera according to the invention.
Figure 10:
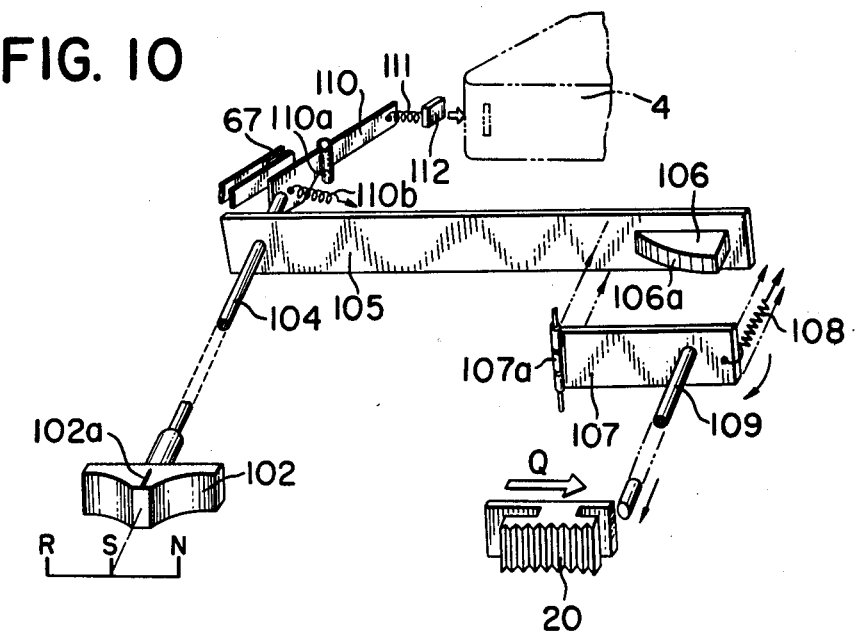
FIG. 10 shows the operating parts shown in FIG. 9 in detailed perspective.

FIGS. 9 and 10 show other variations of the motion picture camera according to the invention, in which camera a magazine capable of synchronous sound recording and an ordinary magazine can be selectively applied by means of a switching operation. In the drawings, an objective lens 100 is mounted on the camera body 103 whose handle carries a shutter release button 101 and which carries an operating button to switch a synchronous sound recording over to an ordinary sound recording. The details of the switching means appear in FIG. 10. The indices "R", "S" and "N" on the camera when aligned with the index 102a on the switching button 102 indicate respectively the positions for synchronous sound recording, ready for synchronous sound recording and for ordinary cranking without sound recording. An axis i.e. rod, 104 on the button 102, moves a sliding plate secured to the rod. A protrusion 106 secured on the sliding plate 105 forms a curved surface 106a, so that the swing plate 107 is pulled by a spring 108 into contact with the curved surface 106a. A pin 109 mounted on the swing plate 107 and serves to lock the operating knob 20 of the cover 12. A lever rotatable around the axis 110a mounted on the camera body, has one end which can engage one end of the rod 104, while the other end comprises compression spring 111 against one end a member 112. The latter serves to press the switching member 8 (see FIGS. 2, 3 and 4) of the magazine 4. A switch 67 can engage the lever 110 and serves to operate the electromagnetic plunger 64.

When the index 102a of the switching knob 102 is aligned with N, the sliding plate 105 is moved from the position in FIG. 10 to the right at the same time the lever 110 biased by the spring 110b is rotated counterclockwise to and pull the member 112 mounted on the other end through the compression spring 111 out of the engagement with the magazine. Thus the switching member 8 of the magazine is not pushed and therefore the film cannot be drawn out of the magazine 4. Hence it is possible to carry out ordinary cranking without sound recording. Also, the lift which the curved surface 106 on the sliding plate 105 gives to the swing plate 107 at this time is at a minimum and the pin 109 withdrawn the most retired position. This allows the knob 20 to be moved freely along the direction Q. In this condition the cover 12 of the magazine chamber can be opened during winding (see FIG. 6).

When the index 102a of the knob 102 is aligned with the index "S" on the camera (FIG. 10), the sliding plate 105 is moved to the position shown in the drawing. Thus the rod 104 rotates the lever 110 clockwise against the force by the spring 110b so that the signal member 112 is pushed against the lever 8 of the magazine 4. This slides the lever 8, so that the film can be led out of the magazine (FIG. 4). At this time the sliding plate 105 has not moved sufficiently to make the pin 109 on the swing plate 107 protrude enough to prevent the knob 20 from moving along the direction Q. Thus it is possible to open the cover 12 by operating the knob 20 as shown in FIG. 6. At this time the switch has not yet been turned off and the film channel outside of the magazine remains inactivated as shown for example in FIG. 8.

When the index 102a of the knob 102 is matched with the index "R" on the camera, the rod 104 moves sliding plate 105 further to the left in FIG. 10 and rotates the lever further clockwise. This turns the switch 67 on, so that the film channel outside of the magazine is formed i.e. activated. The movement of the sliding plate to the left also causes the curved surface 106a to engage the swing plate 107 at its maximum lift and rotates the plate 107 clockwise around the axis 107a against the force of spring 108. Thus, the pin 109 advances to its limit where it controls the end of the knob 20. Hence further movement of the knob along the direction Q is restricted and locks the cover. The rotation of the lever 110 along the clockwise direction is absorbed by the compression spring 111 so that the member 112 is kept in a position to push the switching member 8. In this position for synchronous sound recording the cover is prevented from opening and the synchronous sound recording can be carried out.

Figure 11:
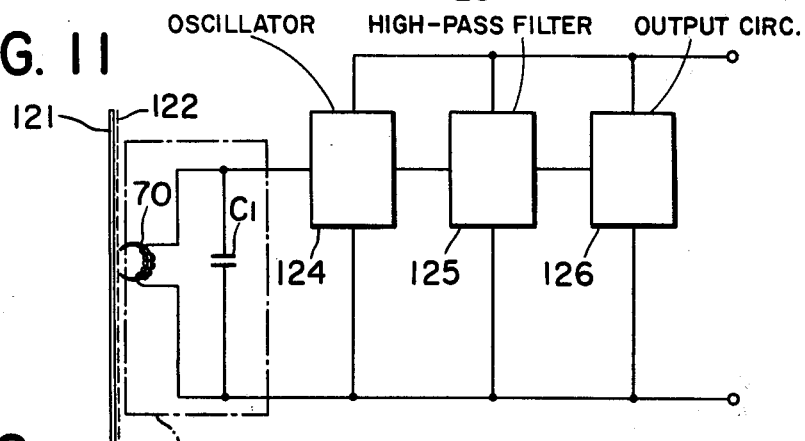
FIG. 11 shows a block wiring diagram of an electrical circuit of the motion picture camera of FIG. 7 and FIG. 8 to control operations such as discharge of the film channel outside of the magazine by detecting the magnetic coating provided on the film.
Figure 12:
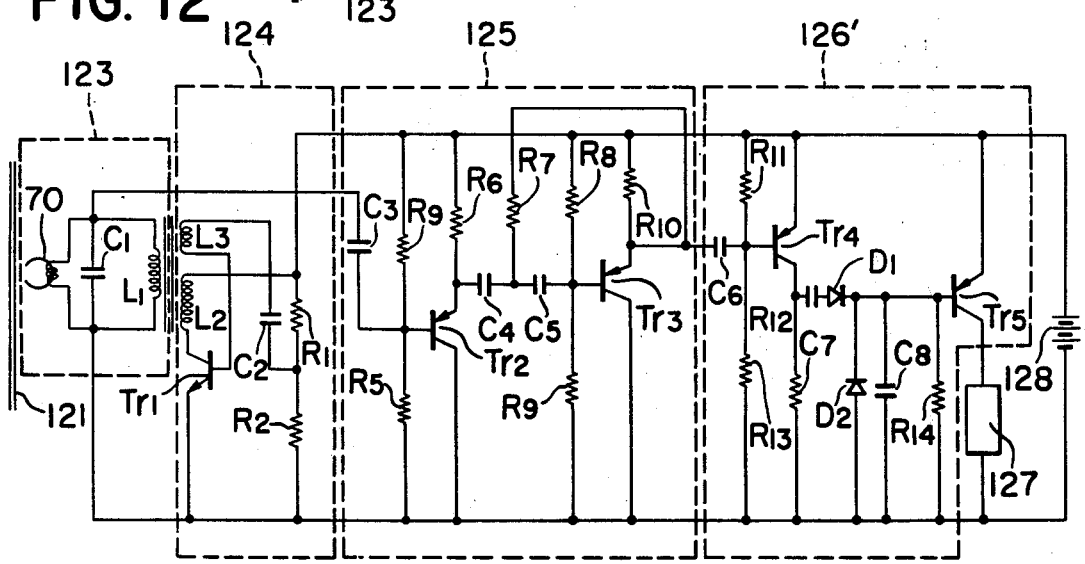
FIG. 12 shows an example of the electrical circuit of FIG. 11 in detail.

FIG. 11 shows a block wiring diagram of an electrical circuit to control a load, for example, for disengagement i.e. deactivation, of the film channel outside of the magazine or the operation or the nonoperation of the sound recording circuit including the optical or the magnetic head, by detecting the magnetic coating on the sound recording film with the magnetic head. FIG. 12 shows the circuit components in detail. In the drawing a magnetic head 70 is disposed opposite the film as shown in FIG. 7 and FIG. 8 so that it can come into sliding engagement with the magnetic coating 122 of the film. 121 in a capacitor $C_1$ parallel with the magnetic head 70 forms a parallel resonance circuit 123. This circuit is connected with the following oscillating circuit 124, which is connected with a filter circuit 125 connected with an output circuit 126.

The parallel resonance circuit 123 and the oscillating circuit 124 both produce a given frequency (A Hz) of oscillation, and the filter circuit 125 allows passage of the frequency A Hz. When the film is fed and the magnetic coating 122 on the film reaches the magnetic head 70, the inductance of the head 70 is changed in such a manner the circuit constant of the parallel resonance circuit is changed. The oscillation frequency then changes from A Hz to B Hz. When the magnetic coating 122 of the film 121 reaches the magnetic head the filter not allow the passage of the frequency B Hz. Thus it is possible to set the camera for sound recording by operating lamps, relays, plungers and so on. It is also possible to indicate the existance of the film with magnetic coating portion in the camera, by detecting the existance of the magnetic coating portion. Also it is possible to lock the cover of the film chamber by operating plungers and the like.

In FIG. 12, the parallel resonance circuit 13 includes a magnetic head 70, a capacitor $C_1$ and a coil $L_1$. Member 124 is an oscillating circuit working in magnetic connection with the parallel resonance circuit 123 and including a transistor $Tr_1$, coils $L_2$ $L_3$, a capacitor $C_2$ and resistances $R_1$ $R_2$. A high-pass filter 125 circuit is composed of transistors $Tr_2$ $Tr_3$, capacitors $C_3$ $C_4$ and $C_5$ and resistances $R_4$-$R_{10}$. A integration circuit 126' is composed of transistors $Tr_4$, $Tr_5$, capacitors $C_6$, $C_7$, $C_8$, diodes $D_1$, $D_2$ and resistances $R_{11}$-$R_{14}$. A load 127 is controlled by the output of the circuit 126'. An electrical source energizes the portions, 124–126.

When the magnetic coating portion has not yet reached the magnetic head 70, the oscillating circuit 124 oscillates to with a frequency $f_1$ which is determined by the constant of the magnetic head 70, the coils $L_1$ and $L_2$, by the magnetic matching constant between the coils $L_1$ and $L_2$ and by the constant of the capacitor $C_1$. Due to the passage of the magnetic coating portion by the magnetic head 70, the constant of the head 70 changes, while constants of other members do not. The magnetic permeability at the magnetic coating portion is higher than when the portion does not exist. Hence the inductance of the magnetic head 70 goes up so that the oscillating frequency goes down. Namely, the oscillating frequency of the oscillating circuit is changed from $f_1$ down to $f_2$. The filter circuit 125 allows the passage of the frequency $f_1$, and rejects the frequency $f_2$. When the frequency of the outputs of the circuits 123, 124 is $f_1$, only the signal which passes through the filter circuit 125 is applied to the transistor $Tr_4$, amplified by the transistor $Tr_4$, rectified by the diodes $D_1$, $D_2$, integrated by the capacitor $C_8$ and applied to the base of the transistor $Tr_5$, whose conductivity is then cut off so that the load 127 does not work.

When the magnetic coating portion of the film has passed by the magnetic head 70, the oscillating frequency of the oscillating circuit is changed to $f_2$, which signal is cut off by the filter circuit 125 in such a manner that there is no input signal for the transistor $Tr_4$ so that the A.C. output of the transistor $Tr_4$ becoms zero and the potential of the capacitor lowers. Hence whereby the transistor $Tr_5$ becomes conductive and the load 127 is operated with its output. In summary, when there is no magnetic coating portion on the film the load is not operated, while when there is, the load is operated and the indication lamp is lighted as mentioned above.

FIGS. 13–16 show an embodiment, using the film feeding device according to the invention, wherein the adaptors and the grip are demountably provided on the camera body and the film driving and the sound recording outside of the magazine are carried out.

Figure 13:
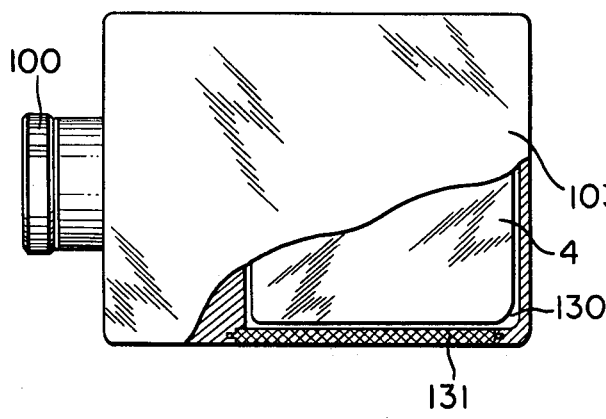
FIG. 13 shows a partially broken side view of the motion picture camera according to the invention, in which the film magazine of FIG. 1 to FIG. 4 can be used, whereby the film channel has not yet switched over to that outside of the magazine.

In FIG. 13, an objective lens 100 is provided on the camera body 103. A film chamber 130 receives a magazine 4 as mentioned above or an ordinary magazine having no film channel outside of the magazine. Member 131 is a separating wall demountable or openable and forming a part of the wall surface of the film chamber.

Figure 15:
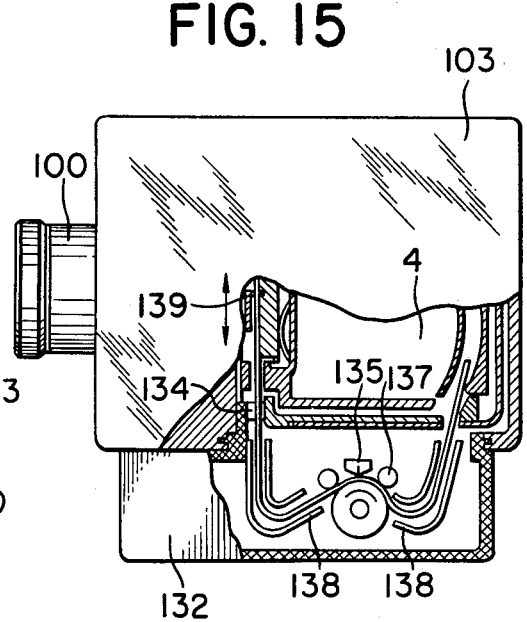
FIG. 15 shows a partially broken side view of the motion picture camera of FIG. 13, on which the adaptor of FIG. 14 is mounted.
Figure 14:
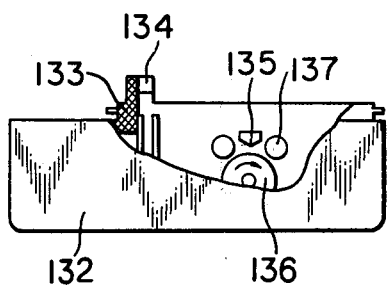
FIG. 14 shows a partially broken side view of an adaptor to be mounted demountably on the motion picture camera of FIG. 13.

FIG. 14 shows an adaptor mountable on the camera shown in FIG. 13 and capable of synchronous sound recording. In FIG. 15 shows this adaptor 132 mounted on the camera after the separating wall 131 of the camera shown in FIG. 13 has been taken out.

The adaptor 132 in FIG. 14 and FIG. 15 incorporates a switching signal member 134 which engages with the switching head 8A (FIG. 3) of the sliding member 8 of the magazine 4 with the mounting member 133 to the camera body 103.

It is also possible that the signal member 134 is not incorporated with the adaptor and provided independently.

The optical or the magnetic head to record sounds on the film may be any photoelectric or electromagnetic transducing means which responds to the output of the microphone incorporated with the adaptor or mountable on the adaptor, where for example the luminous diode can also be applied. To obtain a constant and stabilized running speed of the film opposite to such head device 135 the rollers or the sprocket is driven along the direction of arrow by a driving source not shown in the camera body or a driving source not shown in the adaptor. It is also possible to apply a driving system by means of the capstans and pinch-rollers. Members 137 are a pair of guide rollers. Film guides 138 form a film channel outside of the magazine.

When a magazine as mentioned before is loaded in a camera provided with an adaptor as mentioned above, the head of the switching member 8 of the magazine is pressed by the signal members 134 and the switching member 8 is moved to the right in the drawing. Thus in the lower part of the magazine (FIG. 4) an opening 22 is formed while the openings 6 and 6B align with each other so as to form a film channel. The reciprocated movement along the direction of arrow of the film feeding claws driven by a conventional driving source not shown in the drawing at the film gate 5, feed the film. The latter is exposed to the light, passes by the opening 22, led in the side of the adaptor for synchronous sound recording from the side of camera body, passes through the film channel formed by the guide 138, runs at the head and, after sounds are recorded thereon, passes through the film channel formed by the guide 138 and returns in the magazine chamber by the openings 6 and 6B of the magazine. Thus the synchronous sound recording during photography becomes possible.

Figure 16:
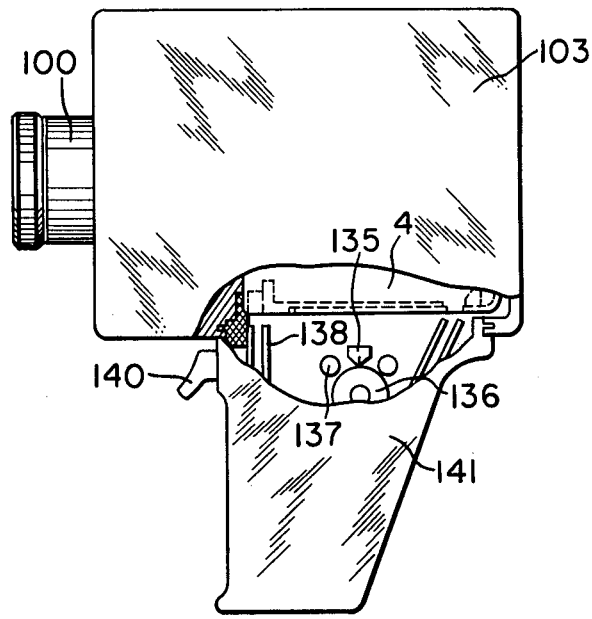
FIG. 16 shows a partially broken side view of a variation of the motion picture camera of FIG. 15.

FIG. 16 shows an embodiment, in which the above mentioned adaptor for sound recording serves as the grip. The common parts bear the same figures and their explanation operation can be simplified if the button for synchronous sound recording works in functional connection with the shutter release button 140 as shown in FIG. 16. It is also possible to use conventional technique to make the shutter release button operate in functional connection with the sound recording according to the necessity for synchronous sound recording, so that its explanation is also omitted.

According to the above mentioned embodiment of the film channel disengaging device, either the means to form the film channel or the means to drive the film is disengaged. Thus it is also possible to disengage both of them.

The present invention, providing the disposition and function as mentioned above, is very useful for operating this kind of the motion picture camera, because it is possible to completely avoid the inconvenience of the knob being opened by mistake type of motion picture camera because it is possible completely to avoid the inconvenience exposed to the light.

Further it is possible to disengage the film channel outside of the magazine with the opening of the cover. It is also possible to take out the film in a position to pass through the channel together with the magazine, when the film is terminated or broken. This kind of device facilitates the operation when the film channel is out of order and very useful for camera operation.

What is claimed is:

1. A motion picture camera for use selectively with a silent film magazine containing a silent film and a sound film magazine containing a sound film comprising:

(A) means forming a chamber in which the silent film magazine and the sound film magazine are selectively loadable, said chamber having a first location for enabling either of the silent film and the sound film to be exposed to light from a scene and a second location for enabling the sound film to have sound signals recorded thereon;

a portion of the silent film being disposable at said first location of the chamber for silent filming and portions of the sound film being disposable at said first and second locations of the chamber for sound filming;

(B) optical means for exposing either of the silent film and the sound film to the scene lights at the first location of the chamber to light from a scene;

(C) a sound recording device having recording head means disposed within the chamber at said second location to record the sound signals on the sound film;

(D) a continuous film transport device to continuously transport the sound film at said second location of the chamber for the sound recording, said continuous film transport device including driving means disposed within the chamber at said second location to continuously transport the sound film for sound recording;

roller means to operatively engage the sound film with said driving means for the continuous transport, said roller means being shiftable between a first position at which the roller means sandwiches the sound film between the driving means and a second position at which the roller means is separated from the driving means; and shifting means for shifting said roller means between said first and second positions;

said shifting means including electromagnetic means to shift said roller means between the first and second positions;

(E) detecting means for detecting whether the second location of the chamber is used by the sound film, said detecting means being arranged for producing a signal upon detecting that the second location of the chamber is used by sound film; and (F) control means responsive to the signal produced by said detecting means to set said film transport device into an operable state, and being electrically coupled to said electromagnetic means and actuating the electromagnetic means in response to the signal produced by the detecting means, so that that roller means is shifted to the first position from the second position by the electromagnetic means.

2. A motion picture camera according to claim 1, wherein said detecting means is constructed to detect the existence of the sound film at the second location of the chamber and to produce the signal upon detecting the existence of the sound film at the second location at the chamber.

3. A motion picture camera according to claim 2, wherein said sound film has a magnetic coating for the sound recording;

and wherein said detecting means has a detecting head disposed within the chamber at said second location for detecting the existence of magnetic material at the second location of the chamber, said detecting head producing the signal upon detecting the existence of the magnetic material at the second location of the chamber;

and wherein said control means is responsive to the signal produced by said detecting head to actuate the electro-magnetic means.

4. A motion picture camera for use selectively with a silent film magazine containing a silent film and a sound film magazine containing a sound film having a magnetic track for the sound recording; comprising:

(A) means forming a chamber in which the silent film magazine and the sound film magazine are selectively loadable, said chamber having a first location for enabling either of the silent film and the sound film to be exposed to light from a scene and a second location for enabling the sound film to have sound signals recorded thereon; a portion of the silent film being disposable at said first location of the chamber for silent filming and portions of the sound film being disposable at said first and second locations of the chamber for sound filming;

(B) optical means for exposing either of the silent film and the sound film at the first location of the chamber to light from a scene;

(C) a sound recording device having recording head means disposed within the chamber at said second location to record the sound signals on the sound film, a sound recording circuit coupled to said recording head means for providing the head means with the sound signals to be recorded on the sound film;

(D) detecting means for detecting whether the second location of the chamber is used by the sound film;

said detecting means having a detecting head disposed within the chamber at said second location for detecting the existence of magnetic material at the second location of the chamber, said detecting head producing a signal upon detecting the existence of the magnetic material at the second location of the chamber;

(E) control means responsive to the signal produced by said detecting means to set said sound recording device to an operable state, said control means being coupled to said recording circuit and responsive to the signal produced by said detecting head to set said recording circuit into an operable state.

* * * * *